US009288720B2

United States Patent
Nukala et al.

(10) Patent No.: US 9,288,720 B2
(45) Date of Patent: Mar. 15, 2016

(54) DYNAMIC NETWORK CELL RESELECTION AFTER A FAILED HANDOVER

(71) Applicant: Apple Inc., Cupertino, CA (US)

(72) Inventors: Gaurav R. Nukala, Sunnyvale, CA (US); Giri Prassad Deivasigamani, San Jose, CA (US); Si Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 14/049,146

(22) Filed: Oct. 8, 2013

(65) Prior Publication Data

US 2014/0099955 A1    Apr. 10, 2014

Related U.S. Application Data

(60) Provisional application No. 61/711,198, filed on Oct. 8, 2012.

(51) Int. Cl.
*H04W 36/36* (2009.01)
*H04W 36/00* (2009.01)

(52) U.S. Cl.
CPC .......... *H04W 36/00* (2013.01); *H04W 36/0055* (2013.01); *H04W 36/36* (2013.01)

(58) Field of Classification Search
CPC ......... H04W 36/00–36/0022; H04W 36/0055; H04W 36/0083–36/0088; H04W 36/04; H04W 36/06; H04W 36/16–36/165; H04W 36/22; H04W 36/36; H04W 36/38; H04W 48/20; H04W 76/06; H04W 76/068; H04W 92/16; H04W 92/20

USPC .......................... 455/422.1, 434–444, 550.1; 370/331–332
See application file for complete search history.

(56) References Cited

U.S. PATENT DOCUMENTS

| | | | | |
|---|---|---|---|---|
| 2007/0072643 | A1* | 3/2007 | Jiang et al. | 455/560 |
| 2007/0293224 | A1* | 12/2007 | Wang et al. | 455/436 |
| 2008/0102841 | A1* | 5/2008 | Kato | 455/442 |
| 2011/0086640 | A1* | 4/2011 | Iwamura et al. | 455/436 |
| 2011/0211458 | A1* | 9/2011 | Ishii et al. | 370/242 |
| 2011/0250925 | A1* | 10/2011 | Han | 455/524 |
| 2011/0263245 | A1* | 10/2011 | Ishii et al. | 455/423 |
| 2012/0294287 | A1* | 11/2012 | Jeong et al. | 370/331 |
| 2013/0017805 | A1* | 1/2013 | Andre-Jonsson et al. | 455/411 |
| 2014/0080484 | A1* | 3/2014 | Centonza et al. | 455/436 |

\* cited by examiner

*Primary Examiner* — George Eng
*Assistant Examiner* — Umair Ahsan
(74) *Attorney, Agent, or Firm* — Downey Brand LLP

(57) ABSTRACT

Apparatus and methods of performing a network cell reselection for a mobile device after a handover attempt fails. Initially, a handover is attempted for the mobile device in a radio resource control (RRC) connected mode from a serving network base station to a target network base station. Next a failure condition associated with the handover attempt is identified by the mobile device. In one scenario, the failure condition is identified in response to the mobile device receiving an RRC connection release message from its serving network base station. In another scenario, the failure condition is identified when the mobile device detects a radio link failure event. Thereafter, the mobile device performs a network scan to identify any available network base stations for the network cell reselection. Subsequently, the mobile device attaches to a preferred network base station of the identified available network base stations to complete the network cell reselection.

19 Claims, 10 Drawing Sheets

DYNAMIC NETWORK CELL RESELECTION AFTER A FAILED HANDOVER

CROSS-REFERENCE TO RELATED APPLICATIONS

The present application claims the benefit of U.S. Provisional Application No. 61/711,198, filed Oct. 8, 2012, the content of which is incorporated herein by reference in its entirety.

TECHNICAL FIELD

The described subject matter generally relates to network cell handover and reselection procedures for a mobile device that is capable of communicating within a Long Term Evolution (LTE) network.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the bandwidth requirements of multi-carrier systems that cumulatively achieve data rates not possible by predecessor LTE versions.

Efficient and seamless mobility control is an important objective for continued LTE and LTE-A system development. Unfortunately, in some LTE network deployments, user equipment (UE) mobility can be negatively impacted by different handover and device power saving mechanisms that are being employed by network service providers during certain network cell handover procedures. For instance, for some device applications, relatively short data communication interruptions may be tolerable (e.g., for applications that download large data files over the Internet), whereas, for other latency-sensitive device applications (e.g., for voice over LTE, VoLTE, or streaming video applications) even short, untimely interruptions in data communications can negatively affect a user's experience.

By way of example, when a single radio LTE (SRLTE) device, such as a UE that is not capable of performing simultaneous LTE data communications alongside legacy network (e.g., CDMA2000 1x) voice call communications, transitions from a coverage area of its serving network base station (e.g., an enhanced NodeB or eNodeB) into a new coverage area associated with a neighbor network base station, the UE can detect (e.g., by periodically measuring specific radio signals) when a received radio power associated with its serving network base station is fading (e.g., due to path loss), at the same time that a received radio power associated with the neighbor network base station is increasing.

In response to detecting this development, the UE can initiate a handover procedure from its serving network base station to a neighbor network base station that is determined to have a stronger radio signal, e.g., from the perspective of the UE. However, in certain situations, this handover attempt may be unsuccessful due to auxiliary communication processes that can interrupt the handover attempt and cause the handover to fail. In circumstances where the handover attempt fails, the UE can be configured to reattach to its serving network base station by default (e.g., in an effort to save device battery power), to rapidly resume communications with a known cell base station.

However, this default reattachment procedure can be detrimental for the UE as its serving network base station may not be capable of providing the UE with reliable, high-throughput communications service at the UE's present location (e.g., as the UE has already substantially roamed away from the coverage area of its serving network base station). For a period of time after this questionable reattachment, any subsequent communications service requests emanating from the UE will be handled by the serving network base station, until a separate network cell reselection procedure is carried out, e.g., after the expiration of a discontinuous reception mode (DRX) timer. During this time the UE must communicate within a cell edge region of its serving cell. As such, a user of the UE will experience degraded device performance that can be associated with delayed, fluctuating, and/or lost data communications.

In this situation, when the UE attempts to transfer or stream data via the Internet, the data may not be presented correctly, or in a timely manner, on a display of the UE. Further, some UEs may be configured to repeatedly attempt to retransmit the same service request to their serving network base station in situations where one or more previous service requests fail due to path loss and increased interference. As a result of these service request retries, network cell re-selection of a better performing neighbor base station can be detrimentally delayed.

Accordingly, there exists a need for a solution that can improve UE device mobility in response to failed handover attempts. LTE network deployments can benefit from this dynamic mobility control when it is employed in conjunction with various network cell handover procedures and/or various network cell reselection procedures.

SUMMARY

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

Some embodiments disclosed herein provide for dynamic network cell reselection for a mobile device after a handover attempt fails due to unanticipated failure conditions that can interrupt the handover attempt. Initially, a handover may be attempted for the mobile device from its serving cell base station to a target, neighbor base station, while the mobile device is in a radio resource control (RRC) connected mode. Next a failure condition associated with an expiration of an inactivity timer during a connected mode discontinuous reception (C-DRX) off duration, or a legacy network (e.g., a CDMA2000 1x) tune-away procedure, which occurs during the handover attempt, can be identified by the mobile device.

In one scenario, the failure condition may be identified in response to the mobile device receiving an RRC connection release message from its serving network base station, and in another scenario, the failure condition may be identified when the mobile device detects a radio link failure (RLF) event. Thereafter, the mobile device can perform a full or partial network scan to identify any available network base stations for the network cell reselection. Subsequently, the mobile device may attach to a preferred network base station of the identified available network base stations to complete the network cell reselection.

In accordance with one aspect of the disclosure, a network failure condition that causes the handover attempt to fail can be detected at the mobile device and initiate the network cell reselection procedure.

In another aspect, the handover attempt can be initiated after the mobile device transmits a measurement report (MR) to the first network base station, where the MR can contain a reference signal receive power (RSRP) of the serving network base station (e.g., the mobile device's serving network base station, prior to the handover attempt) and an RSRP of the target network base station. In some implementations, the MR may also include an indication of a handover threshold being breached or the occurrence of some other handover trigger event.

Further in some situations, the mobile device may transmit the measurement report to its serving network base station in response to determining the RSRP of the first network base to be less than a handover threshold that may be provided to the mobile device within an RRC configuration message or within an RRC reconfiguration message from a network base station or a mobility management entity.

In yet another aspect, the serving network base station and/or the target network base station may correspond to an enhanced NodeB (eNodeB) base station that is capable of long term evolution (LTE) communications with the mobile device, and a serving eNodeB may be configured to schedule/coordinate the handover attempt or the network cell reselection by communicating with the second network base station via an LTE X2 interface or by communicating with a mobility management entity (MME) via an LTE S1 interface.

In accordance with another aspect of the disclosure, a mobile device can be configured to autonomously schedule a network cell reselection after identifying a failure condition associated with a network handover attempt from a serving network base station to a target network base station. As part of the scheduled network cell reselection, the mobile device can scan for one or more available network base stations and then attach to a preferred network base station of the one or more available network base stations.

In another yet another aspect, a wireless communication device can be configured to perform a network cell reselection after a handover attempt. In some implementations, the wireless communication device may include a radio frequency (RF) circuit, one or more processors that are coupled to the RF circuit, and a memory that is coupled to the one or more processors. In some aspects, the one or more processors may be configured to execute computer-executable instructions stored within the memory to cause the wireless communication device to attempt a handover from a first network base station to a second network base station during a radio resource control (RRC) connected mode, identify a failure condition associated with the handover attempt, perform a network scan to identify one or more available network base stations for the network cell reselection after the handover attempt, and then attach to a preferred network base station of the identified one or more available network base stations.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for scheduling and implementing improved network cell handover and network cell reselection procedures are described within this section. Further, various examples for performing network cell reselection searches and scans following a failed network handover attempt are also described herein. These examples are provided to add context to, and to aid in the understanding of, the subject matter of this disclosure. It should be apparent to one having ordinary skill in the art that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments, the terms "wireless communication device," "mobile device," and "user equipment" (UE) may be used interchangeably herein to describe one, or any number of, common consumer electronic communication devices. These devices may include, but not limited to including: cellular phones or smart phones, tablet computers, laptop computers or netbook computers, media player devices, electronic book devices, MiFi® devices, as well as any other type of electronic computing device having fourth generation (4G) Long Term Evolution (LTE) or LTE Advanced (LTE-A) communication capabilities. In various scenarios, these capabilities may allow a respective UE to communicate within a 4G network cell that employs any common type of LTE or LTE-A radio access technology (RAT).

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (1×EV-DO) network, when LTE and LTE-A networks are otherwise unavailable.

Figure 1:
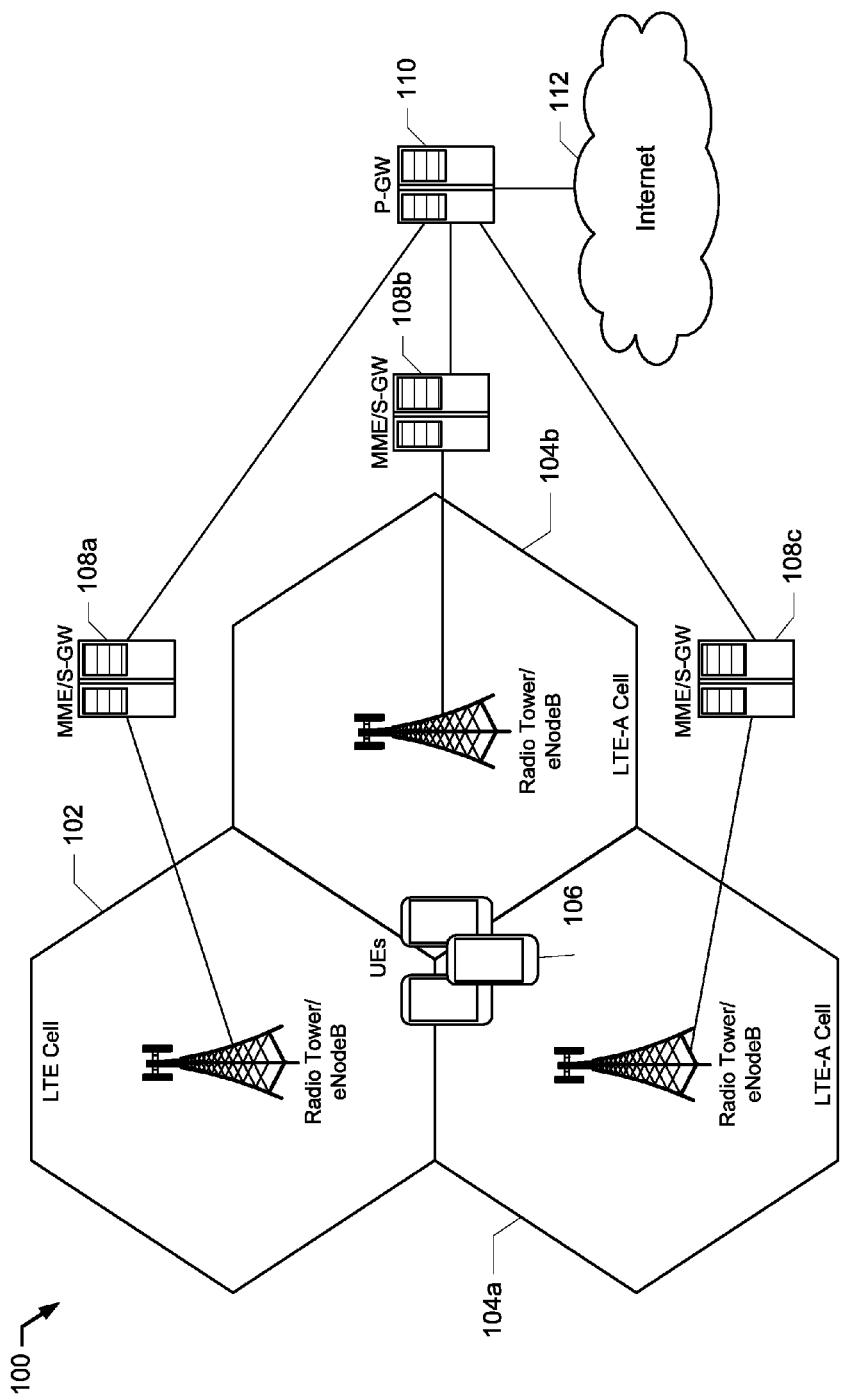
FIG. 1 illustrates a wireless communication system including Long Term Evolution (LTE) and LTE Advanced (LTE-A) network cells that support multiple user equipment (UE) devices that may be configured to perform various network cell handover and reselection procedures, in accordance with some embodiments of the disclosure.

FIG. 1 depicts a wireless communication system 100 that is compliant with the 3GPP Evolved Universal Terrestrial Radio Access (E-UTRA) air interface, and includes, but is not limited to, one LTE network cell 102 and two LTE-A network cells 104a-b, respectively having enhanced NodeB (eNodeB) base stations that can communicate between and amongst each other via an X2 interface. Further, the E-UTRA compliant communication system 100 can include any number of mobility management entities (MMES) 108a-c, serving gateways (S-GWs) 108a-c, PDN gateways (P-GWs) 110, etc., which, as part of the evolved packet core (EPC), can communicate with any of the LTE and LTE-A cell eNodeBs, 102 and 104a-b, via an S1 interface. Additionally, the E-UTRA communication system 100 can include any number of UEs that may be provided wireless communications service by one or more of the eNodeBs of the LTE and LTE-A cells, 102 and 104a-b, at any particular time.

By way of example, a UE 106 may be located within an LTE-A cell 104a-b and in an LTE radio resource control (RRC) Connected mode when it initiates a voice over LTE (VoLTE) application to establish a voice call. The UE 106 running the VoLTE application can place a VoLTE voice call to an intended recipient by communicating voice data to a serving eNodeB 104a-b, which forwards the call through the EPC, 108a-c and 110, and thereby connects to the Internet 112 to transfer the VoLTE communications through an IP Multimedia Subsystem (IMS) network between the caller UE 106 and a receiving device of the intended recipient, which may be a part of a remote network. Alternatively, the UE 106 can initiate any number of different UE-resident applications that may be respectively associated with a particular data type, e.g., streaming audio data, streaming audio-video data, website data, text data, etc., to attempt to transfer IP-based application data via its serving LTE network 104a-b over the Internet 112.

Depending on the data type of a corresponding UE application, a network resource requirement (e.g., associated with network resource blocks or RBs) for communicating the application data may be minimal (e.g., for text or voice data), moderate (e.g., for website webpage data), or substantial (e.g., for streaming audio-video data). Consequently, in some embodiments, a first UE application may be associated with a low-bandwidth data type (e.g., VoLTE-type data); whereas, in other embodiments, a second UE application may be associated with a moderate to high-bandwidth data type (e.g., streaming audio or video data). As would be understood by those skilled in the art, different application communications can be associated with a variety of different application data-type timing sensitivities In some embodiments, a UE 106 may be roaming while actively engaged in latency-sensitive data communications session (e.g., a VoLTE communications session). At a certain instance, the UE 106 may be near the edge region of its serving LTE 102 or LTE-A 104a-b network cell, when the UE 106 identifies a handover condition associated with the occurrence of an LTE handover trigger event, as described further herein. In response to detecting the occurrence of the handover trigger event, the UE 106 can automatically generate a measurement report (MR) to send to its serving eNodeB base station to inform the eNodeB and/or a corresponding MME of the UE's 106 signal strength and signal quality measurements that may be associated with the serving eNodeB and any number of other neighbor network base stations.

After receiving the measurement report from the UE 106, the serving eNodeB may identify a target network base station (e.g., another eNodeB) for the handover attempt, and then collaborate with the target eNodeB, via the X2 interface, to carry out the handover (e.g., an LTE X2-based handover). Alternatively, when the X2 interface is otherwise unavailable between the serving eNodeB and the target eNodeB, the serving eNodeB may communicate with its source MME, which can thereafter collaborate with a target MME (associated with the target eNodeB) to carry out the handover (e.g., an LTE S1-based handover). In either scenario, the MR from the UE 106 to its serving eNodeB may be utilized to initiate the corresponding handover procedure, in response to the UE 106 identifying the occurrence of the handover trigger event.

Figure 2:
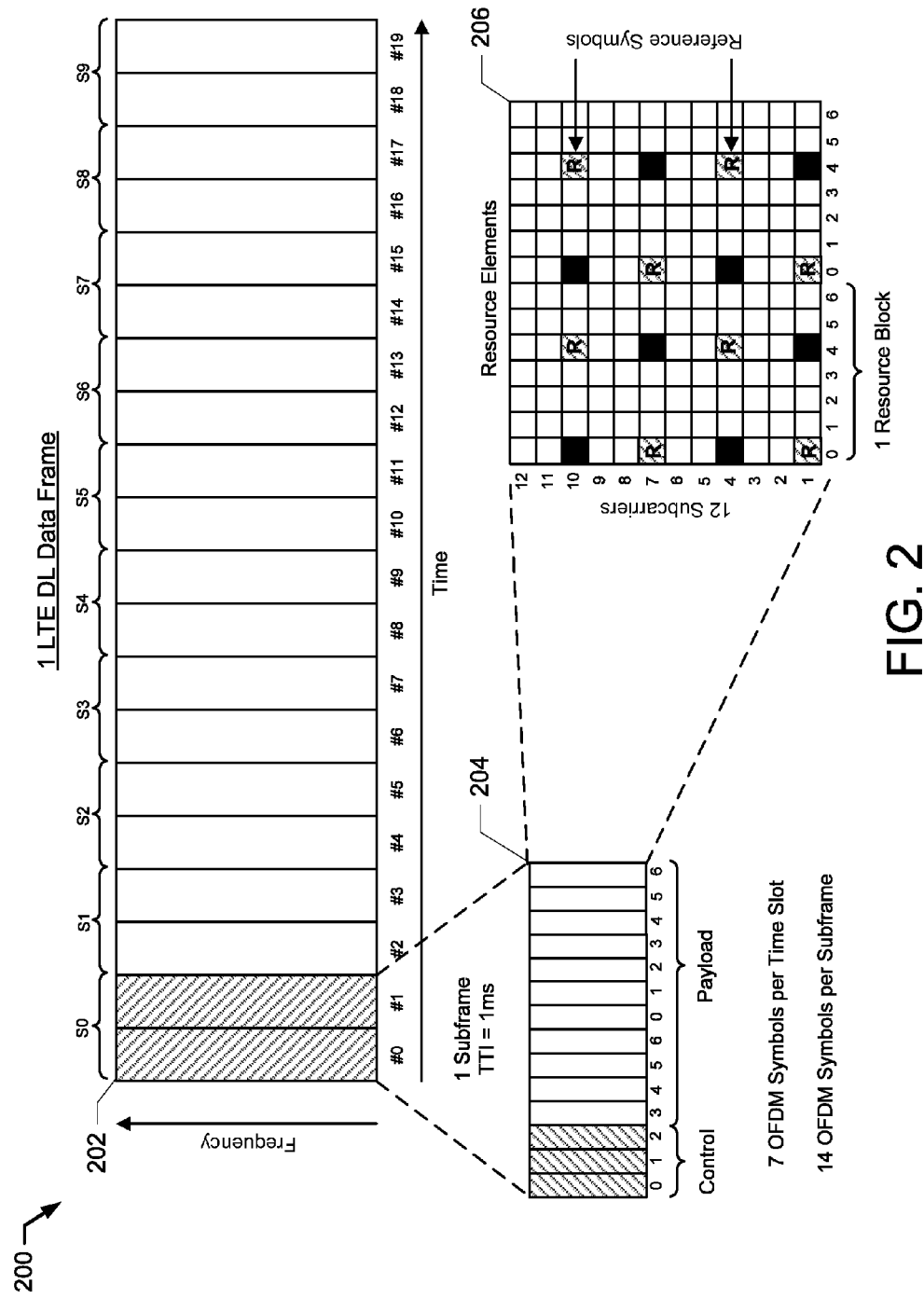
FIG. 2 illustrates a block diagram depicting a single LTE data frame structure including subframe-level characterization, in accordance with various implementations of the disclosure.

FIG. 2 illustrates a block diagram 200 depicting a single LTE data frame structure 202 in accordance with various implementations of the disclosure. As would be understood by those skilled in the art, one LTE data frame 202 includes 10 subframes, labeled S0 through S9, respectively having a transmission time interval (TTI) of 1 ms. each. Each LTE subframe is composed of two time slots having a TTI of 0.5 ms. each. Accordingly, there are 20 time slots, labeled #0 through #19, within each LTE data frame 202. For instance, the first subframe S0 204 of the LTE data frame 202 may be composed of 14 orthogonal frequency division multiplexing (OFDM) symbols, which equates to 7 OFDM symbols per time slot, #0 and #1, of subframe S0 204.

A first portion of the OFDM symbols (e.g., the first three OFDM symbols) of subframe S0 204 may be designated for control signaling information, and the remaining portion of the OFDM symbols of subframe S0 204 may be designated for payload data. It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of 5 μs., or an extended CP having a duration of 17 μs. Therefore, an LTE slot employing a normal CP will typically have 7 OFDM symbols; whereas, an LTE slot employing an extended CP (e.g., intended for use in larger suburban cells) will typically have 6 OFDM symbols. An LTE resource block (RB) is typically associated with 12 OFDM subcarriers transmitting for the duration of one LTE slot. Accordingly, a normal RB (associated with a normal CP) transmitting for 0.5 ms. will comprise 84 OFDM symbols (12 subcarriers×7 OFDM symbols) or resource elements (REs). Likewise, an extended RB (associated with an extended CP) transmitting for 0.5 ms. will comprise 72 REs (12 subcarriers×6 OFDM symbols).

Further, each LTE subframe (S0) can be mapped to a time-frequency grid that consists of two RBs 206, which are respectively composed of 12 consecutive LTE subcarriers over the duration of 7 OFDM symbols (symbols 0-6). An eNodeB can schedule a transmission for each RB during the duration of 1 slot (lasting 0.5 ms). Each RB can consist of either 82 resources elements (REs) for normal CP or 72 REs for extended CP. A RE is the smallest scheduled data unit in LTE, and it consists of one OFDM subcarrier during one OFDM symbol interval. Further, multiple reference symbols (RSs) are included within the subframe time-frequency grid 206 (e.g., per Tx antenna) to facilitate channel measurements and estimations, in a manner that will be described further herein.

Figure 3:
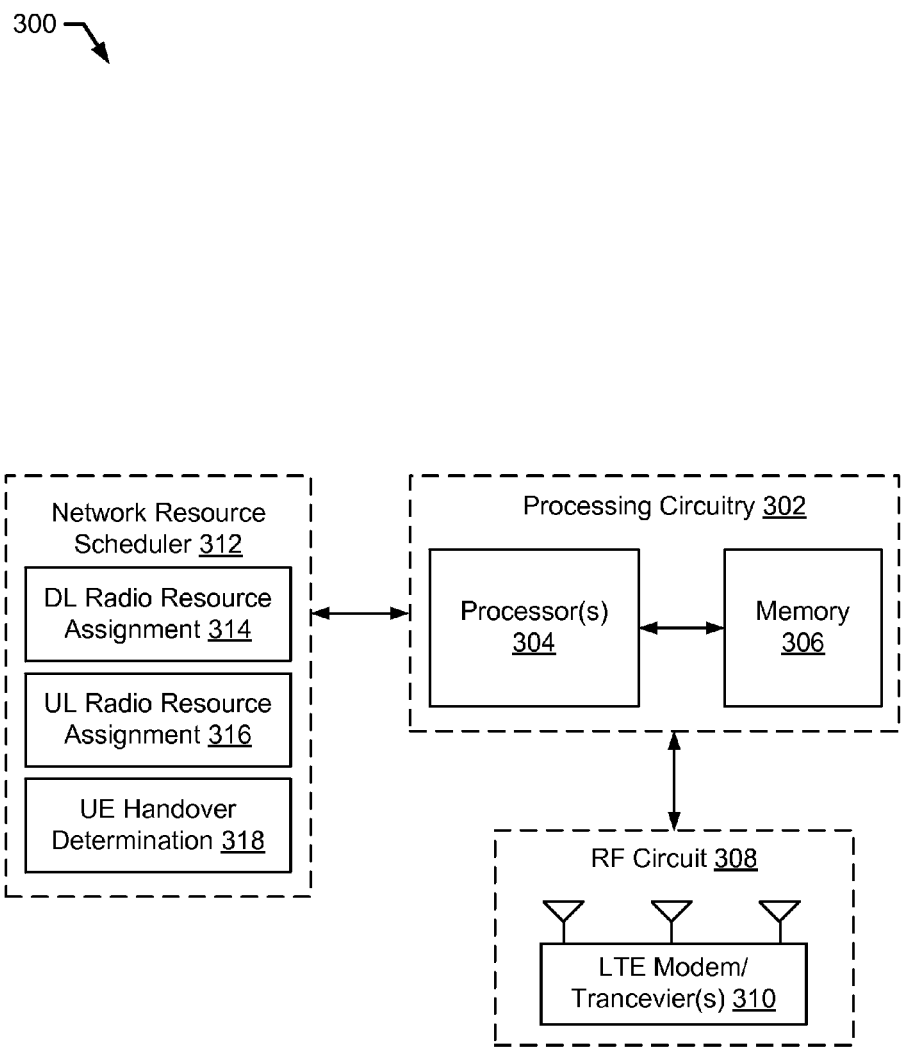
FIG. 3 illustrates a block diagram of a network apparatus including a network resource scheduler having a downlink (DL) radio resource assignment component, an uplink (UL) radio resource assignment component, and a UE handover determination component, in accordance with some embodiments.

FIG. 3 illustrates a block diagram of a network apparatus 300 (e.g., an LTE eNodeB having RRC functionality) with a network resource scheduler 312 having a DL radio resource assignment component 314, an UL radio resource assignment component 316, and a UE handover determination component 318, in accordance with various embodiments of the disclosure. In some implementations, the network resource scheduler 312 can be configured to utilize its DL radio resource assignment component 314 to generate and/or issue various DL radio resource assignments (e.g., carrier DL RB grants) to one or more UEs 106 located within its corresponding network cells (e.g., within an LTE cell 102 or within an LTE-A cell 104a-b). In other situations, the network resource scheduler 312 can also be configured to utilize its UL radio resource assignment component 314 to generate and/or issue various UL radio resource assignments (e.g., carrier UL RB grants) to one or more UEs 106 located within its corresponding network cells (e.g., within an LTE cell 102 or within an LTE-A cell 104a-b).

Further, the network resource scheduler 312 can be configured to employ its UE handover component 318 to schedule and/or coordinate handovers for any number of UEs communicating within a radio coverage area of the eNodeB 300. As described further herein with respect to FIGS. 5-9, an eNodeB 300 may receive a MR in response to an occurrence of one or several defined LTE handover trigger events. Thereafter, the eNodeB 300 can employ its UE handover component 318 of its network resource scheduler 312 to evaluate the MR and determine how and when to schedule a handover for a particular UE. As noted above, in various embodiments, the eNodeB 300 may employ its network resource scheduler 312 to carry out both X2-based handovers (e.g., with eNodeB coordination) and S1-based handovers (e.g., with MME coordination).

In some configurations, the network apparatus 300 (e.g., an eNodeB) can include processing circuitry 302 that can perform various network cell handover scheduling actions, in accordance with one or more embodiments disclosed herein. In this regard, the processing circuitry 302 can be configured to perform and/or control performance of one or more functionalities of the network apparatus 300 in accordance with various implementations, and thus, the processing circuitry 302 can provide functionality for performing various network resource and communication scheduling procedures of the network apparatus 300 in accordance with various embodiments. The processing circuitry 302 may further be configured to perform data processing, application execution and/or other control and management functions according to one or more embodiments of the disclosure.

The network apparatus 300, or portions or components thereof, such as the processing circuitry 302, can include one or more chipsets, which can respectively include any number of coupled microchips thereon. The processing circuitry 302 and/or one or more other components of the network apparatus 300 may also be configured to implement functions associated with various dynamic network resource scheduling procedures, in accordance with various embodiments of the disclosure using multiple chipsets. In some scenarios, the network apparatus 300 may be associated with or employed as an eNodeB of an LTE 102 or an LTE-A cell 104a-b to operate within the wireless communication system 100 of FIG. 1. In this implementation, the network apparatus 300 may include one or more chipsets configured to enable the network apparatus 300 to operate within the wireless communication system 100 as a network base station (e.g., an LTE eNodeB), providing wireless communications service to any number of UEs 106 located within its corresponding wireless coverage area, e.g., a coverage area associated with either an LTE 102 or an LTE-A network cell 104a-b.

In some scenarios, the processing circuitry 302 of the network apparatus 300 may include one or more processor(s) 304 and a memory component 306. The processing circuitry 302 may be in communication with, or otherwise coupled to, a radio frequency (RF) circuit 308 having an LTE compliant modem and one or more wireless communication transceivers 310. In some implementations, the RF circuit 308 including the modem and the one or more transceivers 310 may be configured to communicate using different RAT types. For instance, in some embodiments the RF circuit 308 may be configured to communicate using an LTE RAT, and in other embodiments, the RF circuit 308 may be configured to communicate using an LTE-A RAT. Further, the RF circuit 308 may also be configured to communicate using any number of different 3G legacy RAT types, as well as any number of 2G legacy RAT types.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 304 can be coupled to and/or configured in operative communication with each other and these components may be collectively configured to perform one or more procedures of the network apparatus 300 as described herein in the form of an eNodeB having RRC control functionality.

In some scenarios, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 of the processing circuitry 302 may be capable of performing operations according to various implementations described herein when configured accordingly.

In various embodiments, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal program executions. In this regard, the memory 306 can be configured to store information, data, applications, instructions, or the like, for enabling the network apparatus 300 to carry out various functions in accordance with one or more embodiments of the disclosure. In some implementations, the memory 306 may be in communication with, and coupled to, the processor(s) 304 of the processing circuitry 302, as well as one or more system buses for passing information between and amongst the different device components of the network apparatus 300.

It should be appreciated that not all of the components, device elements, and hardware illustrated in and described with respect to the network apparatus 300 of FIG. 3 may be essential to this disclosure, and thus, some of these items may be omitted, consolidated, or otherwise modified within reason. Additionally, in some implementations, the subject matter associated with the network apparatus 300 can be configured to include additional or substitute components, device elements, or hardware, beyond those that are shown within FIG. 3.

Figure 4:
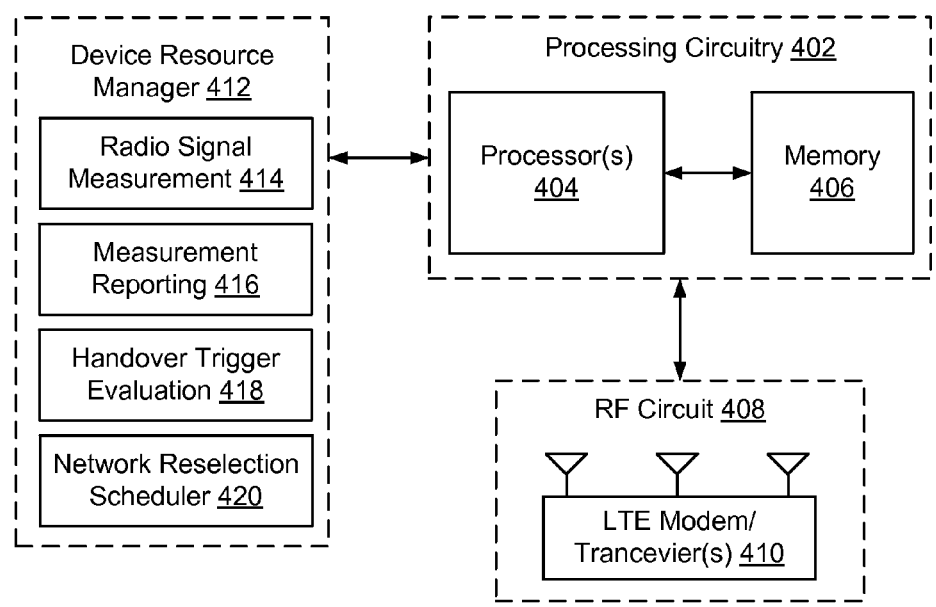
FIG. 4 illustrates a block diagram of a wireless communication device including a device resource manager having a radio signal measurement component, a measurement reporting component, a handover trigger evaluation component, and a network reselection scheduler, in accordance with some implementations of the disclosure.

FIG. 4 illustrates a block diagram of a communication device 400 (e.g., an LTE or LTE-A compliant UE) including an RF circuit 408 having one or more transceiver(s) and an LTE modem 410, as well as, a device resource manager 412 including a radio signal measurement component 414, a measurement reporting component 416, a handover trigger evaluation component 418, and a network reselection scheduler 420 in accordance with some embodiments of the disclosure, which will be described further herein. In various configurations, the communication device 400 can include processing circuitry 402 that can perform various network cell handover and network cell reselection procedures, described further herein with respect to FIGS. 5-9.

Further, the processing circuitry 402 of the communication device 400 can employ the radio signal measurement component 414 to perform various wireless signal received power and received quality measurements (e.g., of various Tx RSs to determine RSRP and/or RSSI/RSRQ metrics) of one or more network base station 300 downlink communications. The processing circuitry 402 of the communication device 400 can also employ the measurement reporting component 418 to report various radio signal measurements made by its radio signal measurement component 414 to a corresponding network apparatus 300 (e.g., the UEs serving eNodeB), such as at a time when its handover trigger evaluation component 418 determines that a handover trigger event has occurred (e.g., in accordance with any of the LTE A1-A5 handover triggers), while roaming between or amongst various network cells.

Additionally, the processing circuitry 402 of the communication device 400 can employ the network reselection scheduler 420 to carry out various dynamic network reselection procedures in response to identifying a handover failure condition. In this regard, the processing circuitry 402 can be configured to perform and/or control performance of one or more functionalities of the communication device 400 in accordance with various implementations, and thus, the processing circuitry 402 can provide functionality for performing different network cell handover and network cell reselection procedures, in accordance with various scenarios that are described further herein. The processing circuitry 402 may further be configured to perform data processing, application execution and/or other control and management functions according to one or more embodiments of the disclosure.

The communication device 400, or portions or components thereof, such as the processing circuitry 402, can include one or more chipsets, which can respectively include any number of coupled microchips thereon. The processing circuitry 402 and/or one or more other components of the communication device 400 may also be configured to implement functions associated with various enhanced device mobility functions using multiple chipsets. In some scenarios, the communication device 400 may be associated with or employed as a multi-mode UE 106 of an LTE 102 or an LTE-A cell 104a-b to operate within the wireless communication system 100 of FIG. 1. In this implementation, the communication device 400 may include one or more chipsets configured to enable the communication apparatus to communicate within the LTE or LTE-A cells, 102 and 104a-b, of the wireless communication system 100.

In various scenarios, the processing circuitry 402 of the communication device 400 may include one or more processor(s) 404 and a memory component 406. The processing circuitry 402 may be in communication with, or otherwise coupled to, a radio frequency (RF) circuit 408 having an LTE compliant modem and one or more wireless communication transceivers 408. In some implementations, the RF circuit 408 including the modem and the one or more transceivers 410 may be configured to communicate using different RAT types. For instance, in some embodiments the RF circuit 408 may be configured to communicate using an LTE RAT, and in other embodiments, the RF circuit 408 may be configured to communicate using an LTE-A RAT. Further, the RF circuit 408 may also be configured to communicate using any number of different 3G legacy RAT types, as well as any number of 2G legacy RAT types.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device 400 can be coupled to and/or configured in operative communication with each other, and these components may be collectively configured to perform one or more procedures of the communication device 400 as described herein in the form of an LTE compliant UE 106.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device 400 to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device 400.

It should be appreciated that not all of the components, device elements, and hardware illustrated in and described with respect to the communication device 400 of FIG. 4 may be essential to this disclosure, and thus, some of these items may be omitted, consolidated, or otherwise modified within reason. Additionally, in some implementations, the subject matter associated with the communication device 400 can be configured to include additional or substitute components, device elements, or hardware, beyond those depicted within FIG. 4.

Figure 5:
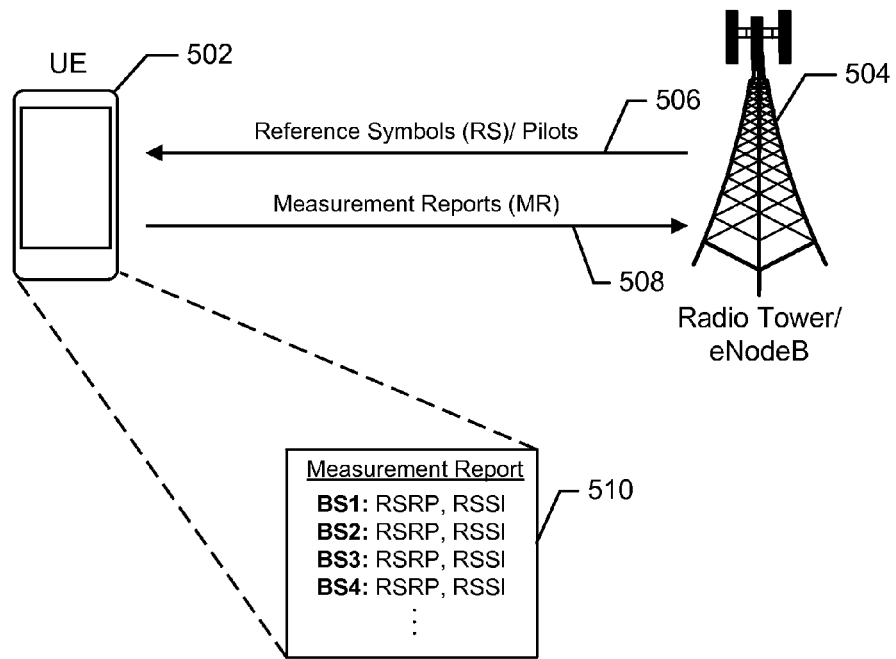
FIG. 5 illustrates a network diagram showing network measurement and reporting between a UE and an eNodeB over the LTE Uu interface, in accordance with some embodiments of the disclosure.

FIG. 5 illustrates a network diagram 500 depicting various network device signaling, measurement, and reporting procedures between a UE 502 and an eNodeB 504 (e.g., via the LTE-Uu interface), in accordance with some embodiments of the disclosure. It should be understood that the eNodeB 500 and the UE 502 depicted in FIG. 5 may be representative of the network apparatus 300 and the communication device 400 depicted in FIGS. 3 and 4. As described herein with respect to FIGS. 2 and 3, an eNodeB 504 can employ the DL radio resource assignment component 314 of its network resource scheduler 312 to schedule various LTE DL data communications over any number subframe slot intervals, in accordance with the resource element time-frequency resource mapping 206 of FIG. 2.

Figure 6:
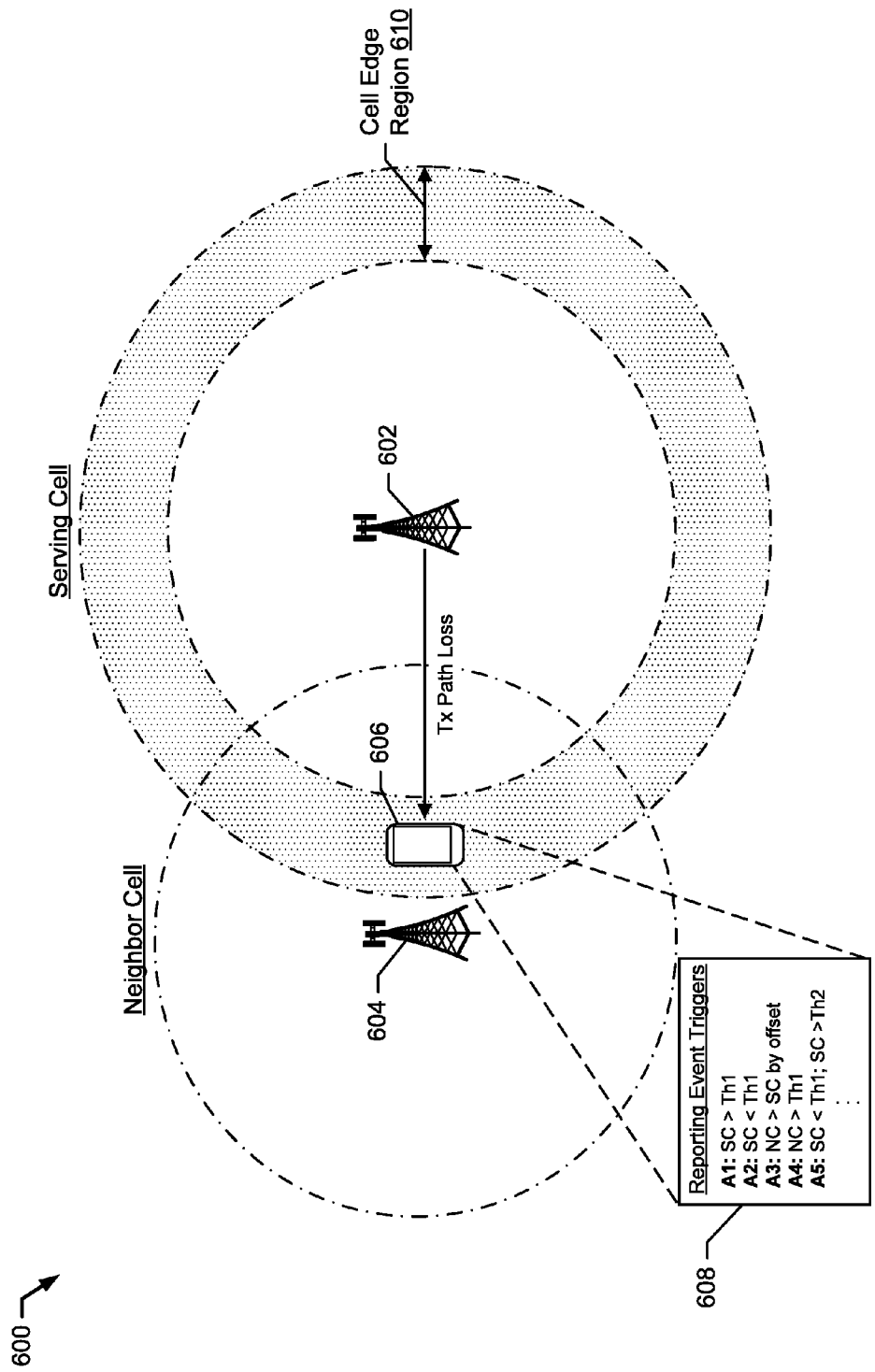
FIG. 6 illustrates a network diagram depicting a UE mobility scenario where a UE transitions from a serving network cell to a neighbor network cells, thereby triggering a handover procedure, in accordance with various implementations of the disclosure.

As previously described, these DL communications can include various RSs, or pilot signals, 506 which can be measured by a UE 502 using its RF circuit 408 and its radio signal measurement component 414, to allow the UE 502 and its serving eNodeB 504 to make various network cell handover and/or various network cell reselection decisions, as described in further detail herein with respect to FIG. 6. For instance, the UE 502 can employ its radio signal measurement component 414 to determine a reference signal received power (RSRP) along with a received signal strength indicator (RSSI) for its serving eNodeB 504 and for any number of neighbor base stations (e.g., neighbor base stations that a UE has detected as a result of a previous network search procedure). The RSRP metric can be defined as the average received signal power of the RSs received by the UE 502 from an eNodeB 504 during a particular time interval of interest.

Thereafter, the UE 502 can determine whether or not a handover trigger event has occurred by evaluating the current RSRP of its serving eNodeB 504 and/or the current RSRP of one or more neighbor base stations 300, e.g., using its handover trigger evaluation component 418. In scenarios where the UE 502 determines that a handover trigger event has occurred, the UE 502 can generate a corresponding MR 510 including these RSRP measurements, and then transmit the event-triggered MR 510 to the UE's 502 serving eNodeB 504 using the UE's 502 measurement reporting component 416, e.g., to effectuate a subsequent handover attempt.

In other scenarios, the UE 502 may also be configured to periodically generate and transmit 508 scheduled MRs 510 (e.g., MRs including RSRP measurements pertaining to a serving eNodeB 504 and any number of neighbor network base stations 300) to its serving eNodeB 504, in the absence of any handover trigger events. In this situation, a non-event triggered MR 510 may still effectuate a network cell handover attempt within the context of various embodiments of the disclosure. As various implementations relate to dynamic network cell reselection procedures that can occur in response to a failed handover attempt, it should be understood that non-event triggered handovers can fail due to auxiliary procedures that occur during the handover attempt. Accordingly, the event-triggered handover described herein with respect to FIG. 6, provides just one example of a handover initiation scenario that is relevant to various embodiments of the disclosure.

FIG. 6 illustrates a network diagram depicting a UE mobility scenario 600 where a UE 606 transitions/roams from a serving network cell associated with a serving eNodeB 602 to a neighbor network cell associated with a neighbor eNodeB 604, thereby triggering a handover procedure when the RSRP of the serving eNodeB 602 drops below network-designated threshold level, in accordance with various implementations of the disclosure. It should be understood that the serving and neighbor eNodeBs, 602 and 604, and the UE 606 depicted in FIG. 6 may be representative of the network apparatus 300 and the communication device 400 depicted in FIGS. 3 and 4. Initially, the UE 606 may be positioned near its serving eNodeB 602 within a first coverage area, where the UE 600 would likely experience good received signal strength, good received signal quality, and minimal network interference from neighboring cells, while communicating with its serving eNodeB 602.

However, in a scenario where the UE 606 roams into a cell edge region 610 associated with its serving network cell, the UE 606 could experience significant amount of Tx radio signal path loss (e.g., for Tx communications from its serving eNodeB 602), as well as a substantial amount of interference from a neighbor eNodeB 604. This can occur as the UE 606 transitions away from its serving cell and closer to the neighbor cell. As would be understood by those skilled in the art, path loss (a.k.a., path attenuation) is associated with a reduction in power density of a radio signal as it propagates through space. Path loss is influenced by geographic terrain, environment, and a distance between a transmitter (e.g., an eNodeB 602) and a receiver (e.g., a UE 606), and the height and location of or one or more transmitting radio antennas (e.g., antennas associated with the RF circuit 308 of an eNodeB 602).

In some embodiments, the UE 606 may periodically measure/monitor the RSRP value of its serving eNodeB 602, as well as the RSRP values of one or more neighbor base stations 604, using its radio signal measurement component 414. At a certain instance, while the UE 606 is roaming away from its serving eNodeB 602, the UE 606 may identify the occurrence of an LTE handover/measurement reporting event. By way of example, Table 1 recites a listing of LTE measurement reporting events that are associated with 3GPP LTE Releases 8 and 3GPP LTE-A Release 10.

TABLE 1

LTE and LTE-A Measurement Reporting Events

Intra-system MR events:

| | |
|---|---|
| A1 | Serving cell > Threshold |
| A2 | Serving cell < Threshold |
| A3 | Neighbor cell > Serving cell by an offset |
| A4 | Neighbor cell > Threshold |
| A5 | Serving cell < Threshold 1; Neighbor cell > Threshold 2 |
| A6 | Neighbor cell > Secondary cell by an offset |

Inter-system MR events:

| | |
|---|---|
| B1 | Inter-system Neighbor cell > Threshold |
| B2 | Serving cell < Threshold 1; Inter-system Neighbor cell > Threshold 2 |

As described above with respect to FIG. 5, when the UE 606 determines that its serving eNodeB 602 has an RSRP value that is less than a network-designated threshold value (e.g., event A1 of Table 1), or when the UE 606 determines that its serving eNodeB 602 has an RSRP value that is less than a first network-designated threshold value at the same time a neighbor eNodeB 604 has a RSRP value that exceeds a second network-designated threshold value (e.g., MR event A5 of Table 1), the UE 606 can generate a corresponding MR 510 and then transmit this MR 510 to its serving eNodeB 602 to initiate a handover from the serving eNodeB 602 to the neighbor eNodeB 604. In various embodiments, any of the measurement reporting events listed in Table 1 may be associated with a handover event trigger 608 that could cause the UE 606 to generate a MR 510 to effectuate a handover attempt.

Figure 7A:
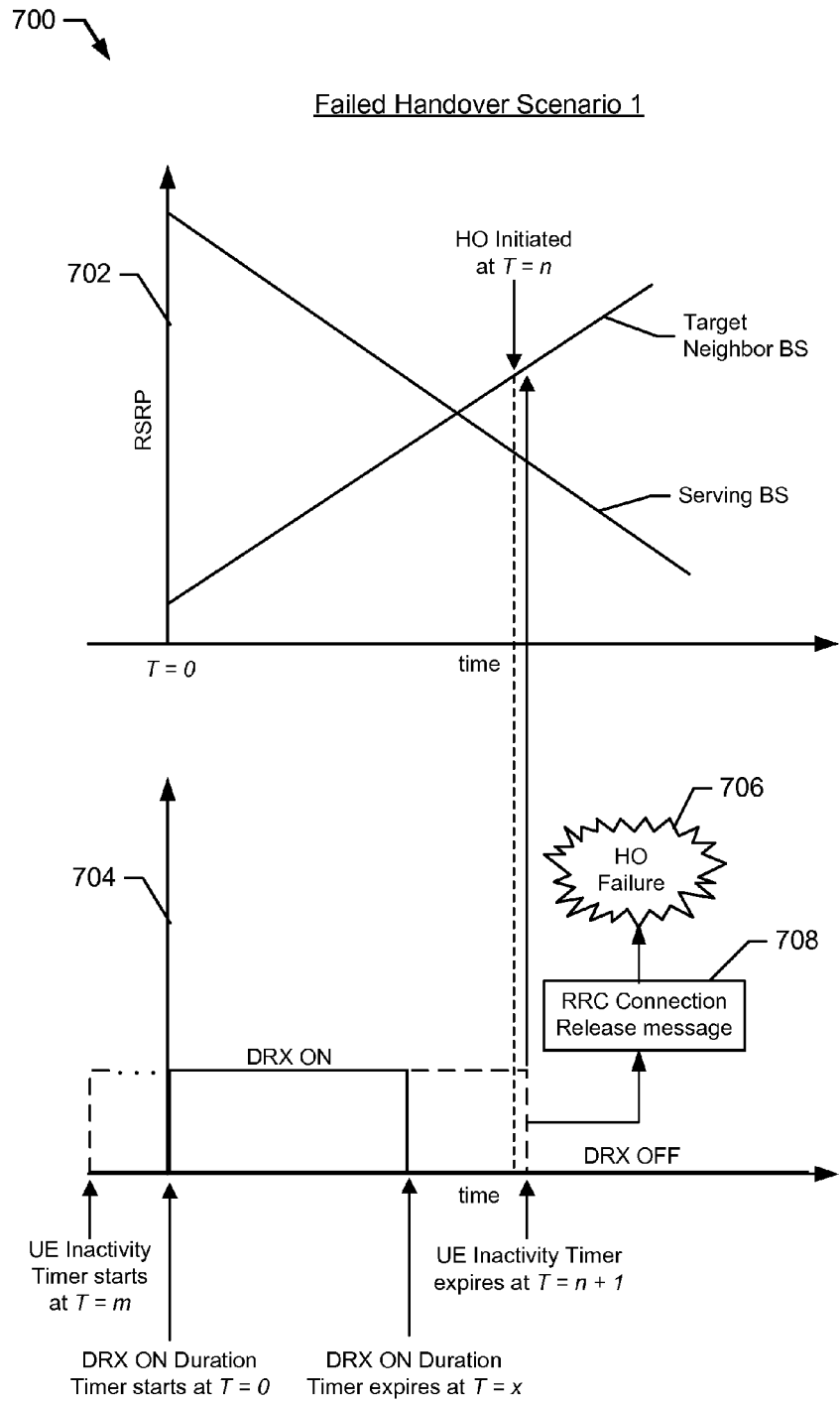
FIG. 7a illustrates a received base station signal strength graph depicting the timeline for a handover attempt that occurs in conjunction with a connected mode discontinuous reception (C-DRX) cycle, which is associated with a first failed handover scenario, in accordance with some embodiments of the disclosure.

FIG. 7a illustrates a diagram 700 including a received base station signal strength graph 702 depicting the timeline for a handover attempt that occurs in conjunction with a connected mode discontinuous reception (C-DRX) cycle 702, which can be associated with a first failed handover scenario. At time T0, the RSRP value associated with a serving network eNodeB 602 may be good, while at the same time, the RSRP value associated with a particular neighbor eNodeB 604 may be poor. However, at a later time T=n, the RSRP value associated with the serving network eNodeB 602 may be poor, while at the same time, the RSRP value associated with the neighbor network eNodeB 604 may be good. As described above, this can happen when a UE 400 roams out of the coverage area associated with the serving network eNodeB 602 and into the coverage area associated with a neighbor network eNodeB 604.

Within a similar time frame, the UE 606 may be in an RRC Connected mode as the C-DRX cycle 704 transitions from a DRX ON duration to a DRX OFF duration at a time T=x, when a corresponding DRX ON duration timer expires. Additionally, the UE 606 may have been inactive (e.g., where the UE 606 is not communicating data with its serving eNodeB 602) for a period of time that can be associated with a UE 606 inactivity timer ON duration. At time T=n the UE 606 can transmit a MR 510 to its serving eNodeB 602 (e.g., in accordance with any of the measurement reporting events, A1-A6 or B1-B2, listed in Table 1) to initiate a handover from its serving eNodeB 602 to a target neighbor eNodeB 604. Shortly thereafter, at a time T=n+1 the UE 606 inactivity timer associated with the UE 606 not having communicated data over the network for a period of time may expire, e.g., during the handover attempt.

In various scenarios, the expiration of the UE 606 inactivity time at time T=n+1, (during the DRX OFF duration) can cause the serving eNodeB 602 to issue an RRC Connection Release message 708 to the UE 606, which causes the UE 606 to abort the handover attempt 706 and transition to an RRC Idle mode from the RRC Connected mode. This untimely RRC state transition instruction can prevent the UE 606 from successfully completing the handover from its serving eNodeB 602 to the neighbor eNodeB 604. Additionally, after the UE 606 receives the RRC Connection Release message 708 from its serving eNodeB 602, and in response to detecting the failed handover 706, the UE 606 can initiate a dynamic network reselection procedure, as will be described further herein with respect to FIG. 8b.

Figure 7B:
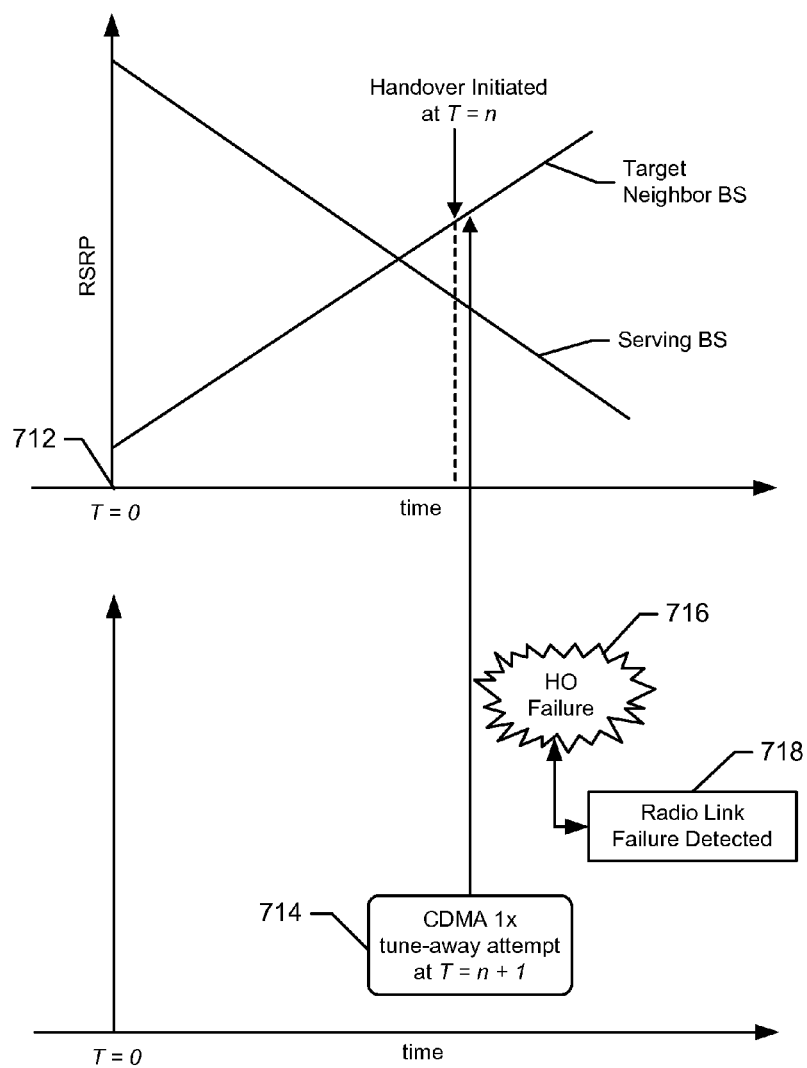
FIG. 7b illustrates a received base station signal strength graph depicting the timeline of a handover attempt that is associated with a second failed handover scenario, in accordance with some embodiments of the disclosure.

FIG. 7b illustrates another diagram 710 depicting a received base station signal strength graph 712 depicting the timeline for a handover attempt that occurs in conjunction with a legacy network tune-away attempt 714, which is associated with a second failed handover scenario. At an initial time T0, the RSRP value associated with a serving network eNodeB 602 may be good, while at the same time, the RSRP value associated with a particular neighbor eNodeB 604 may be poor. However, at a later time T=n, the RSRP value associated with the serving network eNodeB 602 may be poor, while at the same time, the RSRP value associated with the neighbor network eNodeB 604 may be good. As described above, this may occur as the UE 400 roams out of the coverage area associated with the serving network eNodeB 602, and into the coverage area associated with a neighbor network eNodeB 604.

At time T=n the UE 606 can transmit a MR 510 to its serving eNodeB 602 (e.g., in accordance with any of the measurement reporting events, A1-A6 or B1-B2, listed in Table 1) to initiate a handover from its serving eNodeB 602 to a target neighbor eNodeB 604. Shortly thereafter, at a time T=n+1, the UE 606 may receive device instructions to perform a legacy network (e.g., a CDMA2000 1× legacy network) tune-away 714, such as when the UE 606 loses communications with its serving eNodeB 602. This occurrence can result in the UE 606 declaring a radio link failure (RLF) condition 718. An untimely legacy network tune-away attempt can prevent the UE 606 from completing the handover from its serving eNodeB 602 to the neighbor eNodeB 604. In response to the UE 606 declaring the RLF 718 associated with the failed handover attempt 716, the UE 606 can initiate a dynamic network reselection procedure, as described further herein with respect to FIG. 8b.

Figure 8A:
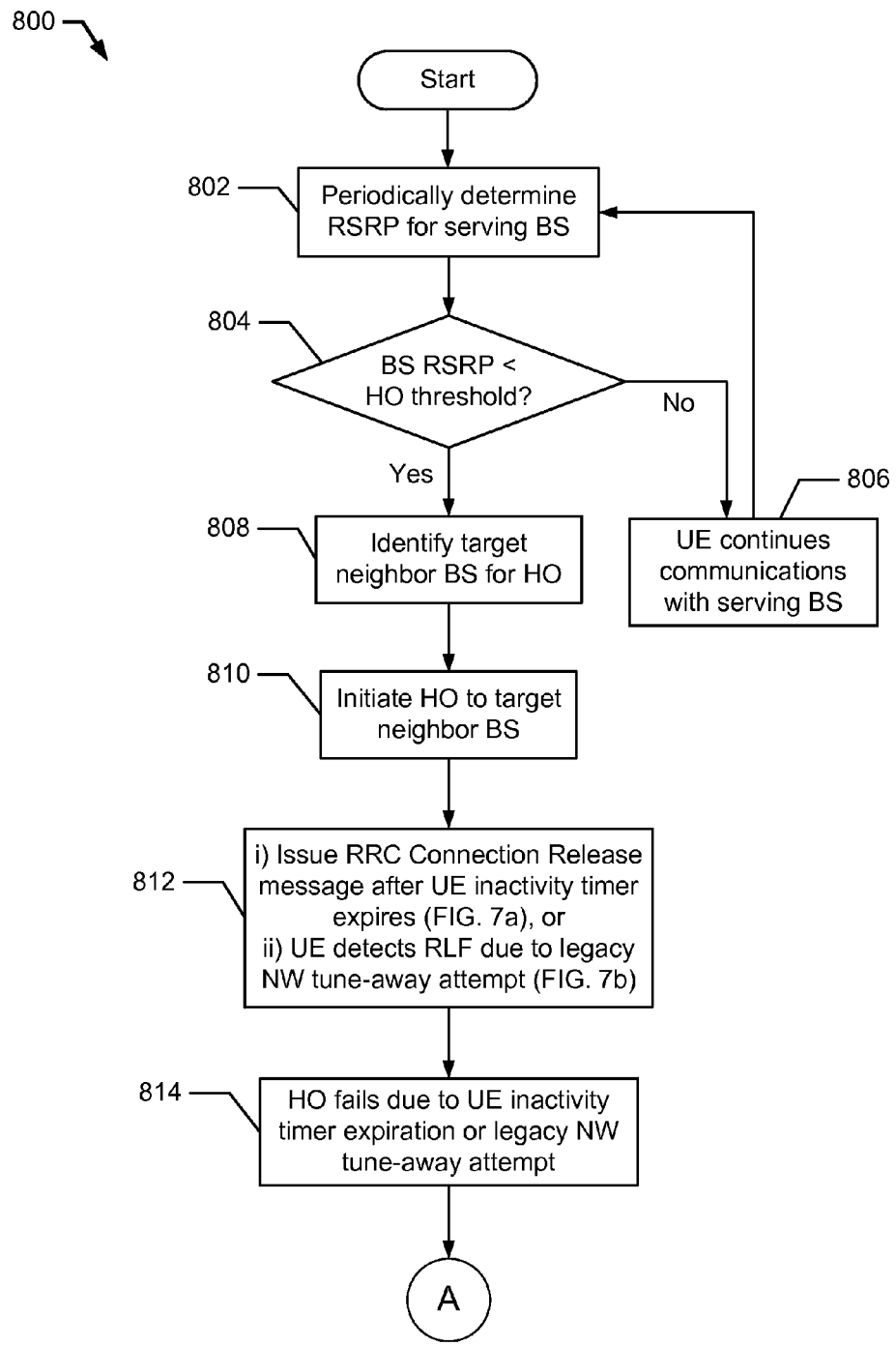
FIG. 8a illustrates a flowchart associated with example methods for attempting a network cell handover from a serving base station to a target neighbor base station, in accordance with various implementations.

FIG. 8a illustrates a flowchart associated with various procedures 800 for attempting a network cell handover from a serving base station to a target neighbor base station, in accordance with various embodiments of the disclosure. In this regard, it should be understood that any or all of the procedures 800 depicted in FIG. 8a may be associated with a method, or methods, that can be implemented by the execution of computer program instructions stored on a non-transitory computer-readable memory 306 of an eNodeB 300, in conjunction with the execution of computer program instructions stored on a non-transitory computer-readable memory 406 of a UE 400.

Initially, at operation block 802, a UE 400 may employ its radio signal measurement component 414 to periodically measure and determine the current RSRP value for its serving eNodeB 300, optionally, in addition to measuring and determining current RSRP values for one or more neighbor eNodeBs (e.g., as described above with respect to FIGS. 5 and 6). Then at decision block 804, the UE 400 may determine whether or not the current RSRP value associated with its serving eNodeB 300 is less than a threshold value. Alternatively, the UE 400 may detect and/or identify any other number of LTE or LTE-A handover triggering events (e.g., events associated with any of the MR events, A1-A6 or B1-B2, listed in Table 1) based on the current RSRP value of its serving eNodeB 300 and/or based on the current RSRP values of one or more neighbor eNodeBs.

In a scenario where the UE 400 determines that the current RSRP value associated with its serving eNodeB 300 is NOT less than the threshold value, at operation block 806, the UE 400 will continue to communicate with its serving eNodeB 300. However, in a scenario where the UE 400 determines that the current RSRP value of its serving eNodeB 300 is less than the threshold value, at operation block 808, the UE 400 will identify a target neighbor base station for the handover attempt. Thereafter, at operation block 810, the serving eNodeB 300 can coordinate with the identified target neighbor base station (or a source MME) and the UE 400 to attempt the handover, as described above.

Next, at decision block 812, the eNodeB 300 can issue the UE 400 an RRC Connection Release message based on a determination that a corresponding UE 400 inactivity timer has expired (e.g., as described above for FIG. 7a). Alternatively, at decision block 812, the UE 400 may detect a radio link failure (RLF) event in response to a legacy network tune-away attempt (e.g., a CDMA2000 1× tune-away attempt) that occurs during the handover attempt (e.g., as described above for FIG. 7b). Thereafter, or substantially at the same time, at decision block 814, the handover attempt will fail due to the UE 400 inactivity timer expiration interruption or due to the legacy network tune-away attempt. In either network cell handover attempt failure scenario (e.g., handover failure scenarios 1 and 2, associated with FIG. 7a or 7b), the procedure 800 can progress to a dynamic network reselection process 820, at operation block 822 of FIG. 8b.

Figure 8B:
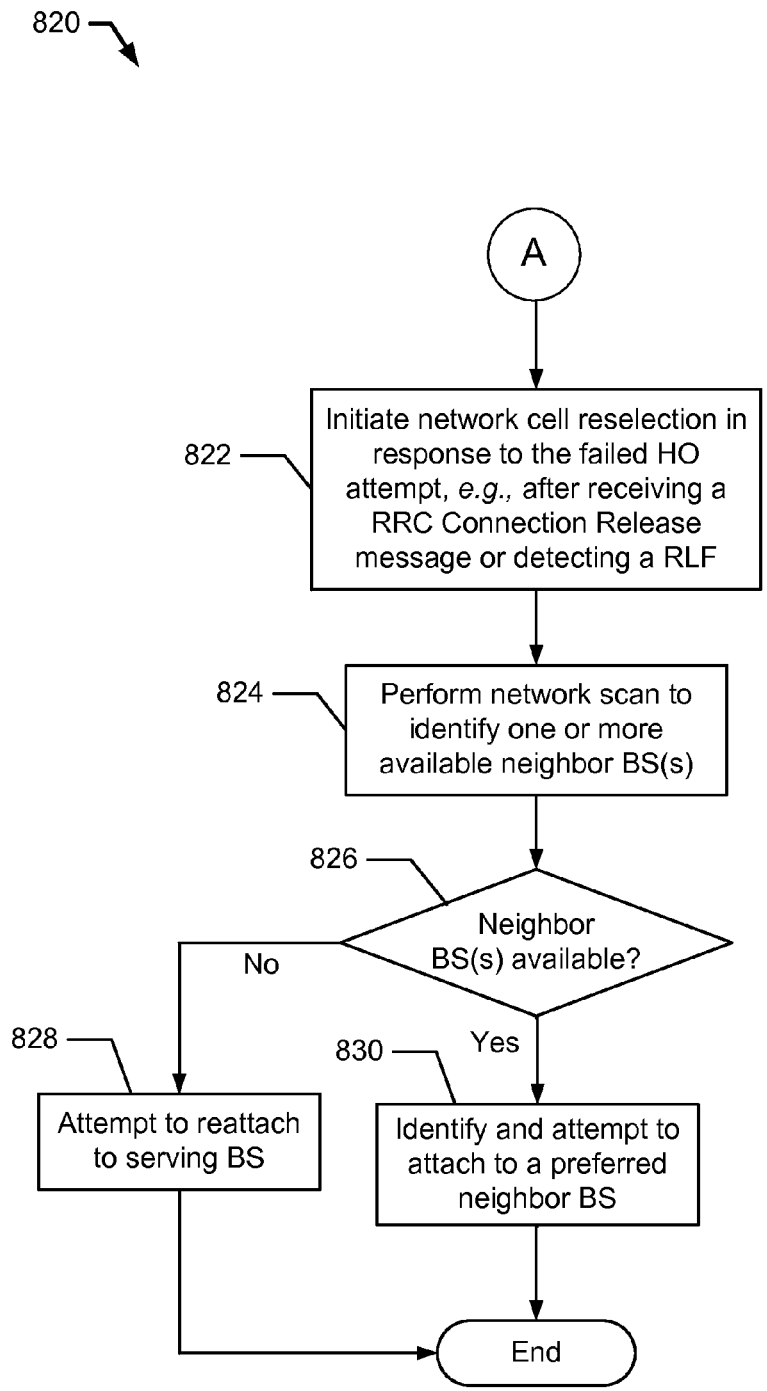
FIG. 8b illustrates a flowchart associated with example methods for performing a network cell reselection in response to a failed network handover attempt, in accordance with some implementations of the disclosure.

FIG. 8b illustrates a flowchart associated with various procedures 820 for performing a dynamic network cell reselection at a UE 400 (e.g., using the UE's 400 network reselection component), in response to a failed network handover attempt (described above with respect to FIG. 8a), in accordance with various embodiments of the disclosure. In this regard, it should be understood that any or all of the procedures 820 depicted in FIG. 8b may be associated with a method, or methods, that can be implemented by the execution of computer program instructions stored on a non-transitory computer-readable memory 406 of a UE 400, in conjunction with the execution of computer program instructions stored on a non-transitory computer-readable memory 306 of an eNodeB 300.

At operation block 822, which continues from operation block 814 of FIG. 8a, the UE 400 may initiate a dynamic network cell reselection procedure using its network reselection scheduler 420, in response to detecting a failed handover attempt that results from a UE inactivity timer expiration (e.g., depicted in FIG. 7a) or a legacy network tune-away attempt (e.g., depicted in FIG. 7b). Thereafter, at operation block 824, the UE 400 can perform a full or a partial network scan to attempt to detect one or more available neighbor network base stations (e.g., various neighbor eNodeBs to its serving eNodeB 300). Then, at decision block 826, the UE 400 can attempt to determine if one or more candidate neighbor base stations has been detected as a result of the full or partial network scan.

In a scenario where no candidate neighbor base stations have been detected as a result of a full or a partial network scan, at operation block 824, the UE 400 may attempt to reattach to its serving eNodeB 300 at operation block 828. However, in a scenario where one or more candidate neighbor base station has been detected as a result of the network scan procedure, the UE 400 can identify and then attempt to attach to a preferred neighbor base station of the one or more candidate neighbor base stations, at operation block 830.

It should be understood that in LTE networks, when a UE 400 roams from the wireless coverage area of a first cell into the wireless coverage area of another cell, either a network cell handover or a network cell re-selection procedure may be performed, based on whether UE 400 is in an RRC Connected mode or an RRC Idle mode. In scenarios where the UE 400 is in an RRC Connected mode, the UE's 400 serving eNodeB 300 can send the UE 400 an RRC Configuration message that includes information about how and when the UE 400 should report serving cell and neighbor cells measurements to its serving eNodeB 400, e.g., in accordance with the Measurement Configuration Information Element (IE).

As described above, UE 400 MR generation can be either event-triggered or periodically scheduled via an RRC Configuration message or an RRC Reconfiguration message. In various embodiments, when a UE 400 determines the RSRP value associated with its serving eNodeB 300 to be less than a designated threshold value, e.g., a network-designated S-measurement value, the UE 400 may transmit an associated MR to its serving eNodeB 300 in accordance with its RRC Connection Configuration message. After the serving eNodeB 300 identifies a target neighbor base station for a handover attempt, the serving eNodeB 300 can send a subsequent RRC Connection Reconfiguration message to the UE 400, which includes a target cell base station's system information. Next, the UE 400 can acknowledge receipt of the RRC Connection Reconfiguration message by transmitting a RRC Connection Reconfiguration Complete message, followed by handover Random Access Channel (RACH) message to the eNodeB 300 to attempt to acquire synchronization information of the target neighbor base station.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method of performing a cell reselection for a mobile device, the method comprising:
by the mobile device:
attempting a handover from a serving base station to a first neighbor base station;
receiving, from the serving base station during the handover attempt, a connection release message, wherein the connection release message is associated with an expiry of a mobile device data inactivity timer;
identifying receipt of the connection release message during the handover attempt as causing the handover attempt to fail;
performing, in response to the identifying, a network scan to determine a second neighbor base station for a cell reselection attempt; and
attaching to the second neighbor base station.

2. The method of claim 1, wherein the handover fails during a connected mode discontinuous reception (C-DRX) off duration.

3. The method of claim 1, further comprising:
transmitting a measurement report to the serving base station, wherein the measurement report comprises a reference signal receive power (RSRP) of the serving base station and an RSRP of the first neighbor base station.

4. The method of claim 3, further comprising:
determining the RSRP of the serving base station to be less than a handover threshold, wherein the handover threshold is provided to the mobile device within a radio resource control (RRC) configuration message or within an RRC reconfiguration message from the serving base station.

5. The method of claim 1, wherein the serving base station comprises an enhanced NodeB (eNodeB) base station that is capable of Long Term Evolution (LTE) communications with the mobile device, and wherein the serving base station schedules the handover attempt by communicating with the first neighbor base station via an LTE X2 interface or by communicating with a mobility management entity (MME) via an LTE S1 interface.

6. A mobile device configurable to perform a cell reselection, the mobile device comprising:
a radio frequency (RF) circuit;
one or more processors coupled to the RF circuit; and
a memory coupled to the one or more processors,
wherein the one or more processors are configured to execute computer-executable instructions stored within the memory to cause the mobile device to:
attempt a handover from a serving base station to a first neighbor base station;
receive, from the serving base station during the handover attempt, a connection release message wherein the connection release message is associated with an expiry of a mobile device data inactivity timer;
identify receipt of the connection release message during the handover attempt as causing the handover attempt to fail;
perform, in response to the identification, a network scan to determine a second neighbor base station for a cell reselection attempt; and
attach to the second neighbor base station.

7. The mobile device of claim 6, wherein the handover fails during a connected mode discontinuous reception (C-DRX) off duration.

8. The mobile device of claim 6, wherein the one or more processors are further configured to execute computer-executable instructions stored within the memory to cause the mobile device to:
transmit a measurement report to the serving base station, the measurement report comprising a reference signal receive power (RSRP) of the serving base station and an RSRP of the first neighbor base station.

9. The mobile device of claim 8, wherein the one or more processors are further configured to execute computer-executable instructions stored within the memory to cause the mobile device to:
transmit the measurement report to the serving base station in response to determining the RSRP of the serving base station to be less than a handover threshold, wherein the handover threshold is provided to the mobile device within a radio resource control (RRC) configuration message or within an RRC reconfiguration message from the serving base station.

10. The method of claim 1, wherein the first neighbor base station is the second neighbor base station.

11. A non-transitory computer-readable medium storing instructions that, when executed by one or more processors of a mobile device, cause the mobile device to perform a cell reselection by carrying out steps that include:
attempting a handover from a serving base station to a first neighbor base station;
receiving, from the serving base station during the handover attempt, a connection release message, wherein the connection release message is associated with an expiry of a mobile device data inactivity timer;
identifying receipt of the connection release message during the handover attempt as causing the handover attempt to fail;
performing, in response to the identifying, a network scan to determine a second neighbor base station for a cell reselection attempt; and
attaching to the second neighbor base station.

12. The non-transitory computer-readable medium of claim 11, wherein the handover fails during a connected mode discontinuous reception (C-DRX) off duration.

13. The method of claim 1, wherein the mobile device comprises a radio signal measurement component, and wherein the network scan is based on a power measurement performed by the radio signal measurement component.

14. The method of claim 1, wherein the mobile device comprises a network reselection scheduler, the method further comprising:
scheduling, by the network reselection scheduler, a reselection attempt in response to the connection release message.

15. The method of claim 1, wherein the mobile device comprises a handover trigger evaluation component, the method further comprising:
determining, by the handover trigger evaluation component, before the handover attempt from the serving base station to the first neighbor base station, that a handover trigger event has occurred.

16. The mobile device of claim 6, wherein the first neighbor base station is the second neighbor base station.

17. The mobile device of claim 6, further comprising:
a radio signal measurement component configured to provide a power measurement as part of the network scan.

18. The mobile device of claim 6, further comprising:
a network reselection scheduler configured to schedule a reselection attempt in response to the connection release message.

19. The mobile device of claim 6, further comprising:
a handover trigger evaluation component configured to determine, before the handover attempt from the serving base station to the first neighbor base station, that a handover trigger event has occurred.

* * * * *